United States Patent [19]

Kamijyo

[11] Patent Number: 4,690,813

[45] Date of Patent: Sep. 1, 1987

[54] MOLYBDENUM OXIDE WHISKERS AND A METHOD OF PRODUCING THE SAME

[75] Inventor: Yoshimi Kamijyo, Furukawa, Japan

[73] Assignee: Alps Electric Co., Ltd., Japan

[21] Appl. No.: 775,659

[22] Filed: Sep. 13, 1985

[30] Foreign Application Priority Data

Sep. 14, 1984 [JP] Japan ................................. 59-193751
Oct. 19, 1984 [JP] Japan ................................. 59-220073
Oct. 19, 1984 [JP] Japan ................................. 59-220074

[51] Int. Cl.$^4$ ............................................. C01G 39/02
[52] U.S. Cl. .................................................... 423/606
[58] Field of Search ........................................ 423/606

[56] References Cited

PUBLICATIONS

Hampel, "Rare Metals Handbook", Reinhold Pub. Co., N.Y., 1954, pp. 271–280.
Mellor, "A Comprehensive Treatise on Inorganic & Theoretical Chemistry", vol. 11, 1931, Longmans, Green & Co., N.Y., pp. 512–513.

Primary Examiner—H. T. Carter
Attorney, Agent, or Firm—Guy W. Shoup

[57] ABSTRACT

A whisker of molybdenum oxide in the form of a filament, rod or flake. Molybdenum oxide whiskers are produced by firing metallic molybdenum at a temperature of at least 400° C., preferably at least 800° C., in an atmosphere containing oxygen, or by firing an organic molybdenum compound in an atmosphere containing oxygen at a temperature which is at least equal to its thermal decomposition temperature. They are very strong crystals which are expected to be useful as a filler for plastics and for a variety of other applications.

3 Claims, 3 Drawing Figures

MOLYBDENUM OXIDE WHISKERS AND A METHOD OF PRODUCING THE SAME

BACKGROUND OF THE INVENTION

1. Field of the Invention

This invention relates to metal oxide whiskers which are used as a filler for plastics, and more particularly, to molybdenum oxide ($MoO_3$) whiskers and a method of producing the same.

2. Description of the Prior Art

A metal oxide can form thin rods, filaments, needles or flakes. They are all called whiskers. Aluminum oxide ($Al_2O_3$), zinc ozide (ZnO), beryllium oxide (BeO) and magnesium oxide (MgO) are, for example, known as metal oxides forming whiskers. These whiskers are used as a filler for plastics because of their high strength, as well as their special shapes as hereinabove mentioned. A study is under way for ascertaining the possibility of using these whiskers for a variety of other applications.

There is, however, not known as yet any whisker of molybdenum oxide ($MoO_3$), or any of its properties.

SUMMARY OF THE INVENTION

It is an object of this invention to provide whiskers of molybdenum oxide which are expected to be a novel material which is useful for a variety of industrial applications.

It is another object of this invention to provide an effective method of producing whiskers of molybdenum oxide.

The whiskers of this invention comprise molybdenum oxide ($MoO_3$) and have the form of filaments, rods or flakes.

The method of this invention is characterized by firing metallic molybdenum at a temperature of at least 400° C. in an atmosphere containing oxygen.

A preferred method embodying this invention is characterized by firing metallic molybdenum at a temperature of at least 400° C. in an atmosphere containing oxygen, recovering the resulting whiskers of molybdenum oxide, and heating the remaining molybdenum oxide to a temperature of 950° C. to 1100° C. in a hydrogen atmosphere to reduce it into metallic molybdenum which may be reused as the starting material.

Another method embodying this invention is characterized by firing an organic molybdenum compound at a temperature at least equal to its thermal decomposition temperature in an atmosphere containing oxygen.

Other objects, features and advantages of this invention will become apparent from the following description.

DETAILED DESCRIPTION OF THE PREFERRED EMBODIMENTS

Figure 1:
FIGS. 1 to 3 are microphotographs of 15 magnifications showing the crystal structures of molybdenum oxide whiskers according to this invention.

The whiskers of this invention comprise molybdenum oxide ($MoO_3$) and have the form of filaments, rods or flakes. The whiskers in the form of filaments or rods have a diameter of several to several tens of microns and a length of several hundred microns to several millimeters. The whiskers in the form of flakes have a thickness of several to several hundred microns, a width of several tens of to several hundred microns and a length of several hundred microns to several millimeters. The whiskers of molybdenum oxide are very strong crystals. They are expected to be useful as a filler for plastics, and for a variety of other industrial applications.

The whiskers of this invention can be produced if metallic molybdenum is fired at a temperature of at least 400° C., preferably at least 800° C., in an atmosphere containing oxygen. The metallic molybdenum to be used as the starting material may be of any form, such as sheet, filament, rod, granule or powder. It is fired in an atmosphere containing oxygen. The term "atmosphere containing oxygen" as herein used means an atmosphere consisting of oxygen, or an atmosphere containing oxygen, such as air. It is fired in an open heat-resistant vessel, such as an alumina substrate, or a porcelain or quartz crucible. An industrially appropriate apparatus may, for example, comprise a reaction vessel having an inlet and an outlet for a gas containing oxygen, a porous plate disposed in the reaction vessel across a passage for the gas, means for supplying metallic molybdenum onto the porous plate, and means for heating the porous plate and its vicinity to a temperature of at least 800° C.

The material is heated at a temperature of at least 400° C. No whisker is produced efficiently if the heating temperature is lower than 400° C. Metallic molybdenum is considered to form single crystals defining whiskers during a weight reduction due to sublimation or vaporization if it is oxidized at a high temperature. Accordingly, the more sublimation or vaporization takes place during its oxidation, the more efficiently whiskers are formed. If the oxidizing rate of metallic molybdenum is expressed by the rate of its weight reduction, it is about $-10$ $mg/cm^2$ at a temperature of 700° C., or about $-310$ $mg/cm^2$ at a temperature of 800° C., per hour. Its oxidation proceeds by far more actively at a temperature of at least 800° C., resulting in the formation of numerous whiskers, than at a lower temperature. It is, therefore, preferable to employ a firing temperature of at least 800° C. The firing time depends on, for example, the amount of the metallic molybdenum to be heated, the amount of the oxygen being supplied into the reaction vessel and the firing temperature, but it is, of course, necessary to continue heating it until it is completely oxidized.

After metallic molybdenum has been fired in an atmosphere containing oxygen, the resulting whiskers of molybdenum oxide are recovered. It is thereafter possible to heat the remaining molybdenum oxide at a temperature of 950° C. to 1100° C. in a hydrogen atmosphere to reduce it into metallic molybdenum so that it may be reused as the starting material.

The whiskers of molybdenum oxide can also be produced if an organic molybdenum compound is fired in an atmosphere containing oxygen at a temperature which is at least equal to its thermal decomposition temperature. For this purpose, it is possible to employ a complex compound, such as molybdenum(VI) dioxyacetylacetonate, molybdenum(VI) acetylacetonate, molybdenum(VI) 8-hydroxyquinoline or molybdenum(VI) diethyldithiocarbamate. The compound is fired at a temperature which is at least equal to its thermal decomposition temperature, for example, at a temperature of at least 400° C., or preferably at least 700° C. The firing time depends on, for example, the amount of the compound to be fired, the amount of the oxygen supplied and the firing temperature, but it is, of course, necessary to continue heating the compound until it is completely decomposed to form molybdenum oxide. If the compound is decomposed, its organic component scatters and the remaining molybdenum is oxidized to form molybdenum oxide whiskers.

The invention will now be described more specifically with reference to a variety of examples thereof.

EXAMPLE 1

One gram of metallic molybdenum powder having a purity of 99.9% and a grain size of 0.5 to 1 micron was placed on an alumina substrate and fired at 400° C. in the air for 60 minutes. There were obtained about 100 mg of molybdenum oxide whiskers having a diameter not exceeding five mcrons and a length not exceeding 0.5 mm.

EXAMPLE 2

One gram of metallic molybdenum powder having a purity of 99.9% and a grain size of 0.5 to 1 micron was placed on an alumina substrate and fired at 600° C. in the air for 60 minutes. There were obtained about 300 mg of molybdenum oxide whiskers having a diameter not exceeding 50 microns and a length not exceeding 2 mm.

EXAMPLE 3

One gram of metallic molybdenum powder having a purity ov 99.9% and a grain size of 0.5 to 1 micron was placed on an alumina substrate and fired at 800° C. in the air for 60 minutes. There were obtained about 500 mg of molybdenum oxide whiskers including those in the form of rods having a diameter not exceeding 70 microns and a length not exceeding 5 mm, or those in the form of flakes having a width not exceeding 300 microns, a thickness not exceeding 20 microns and a length not exceeding 7 mm. FIG. 1 is a microphotograph of 15 magnifications of those whiskers.

EXAMPLE 4

The molybdenum oxide powders which had not formed whiskers in Examples 1 to 3 were heated to 950° C., 1000° C., 1050° C. and 1100° C. for 60 minutes in a hydrogen atmosphere and thereby reduced into metallic molybdenum powders. Each of the regenerated molybdenum powders was fired at 800° C. for 60 minutes on an alumina substrate. There were obtained molybdenum oxide whiskers which were substantially equal to those obtained in Example 3.

EXAMPLE 5

A 10 mm square, 0.2 mm thick sheet of 99.9% purity metallic molybdenum weighing 0.2 g was placed on an alumina substrate and heated at 800° C. for an hour in the air. There was obtained about 0.21 g of molybdenum oxide whiskers, while about 0.06 g of metallic molybdenum was found to remain without forming molybdenum oxide whiskers.

EXAMPLE 6

Figure 2:
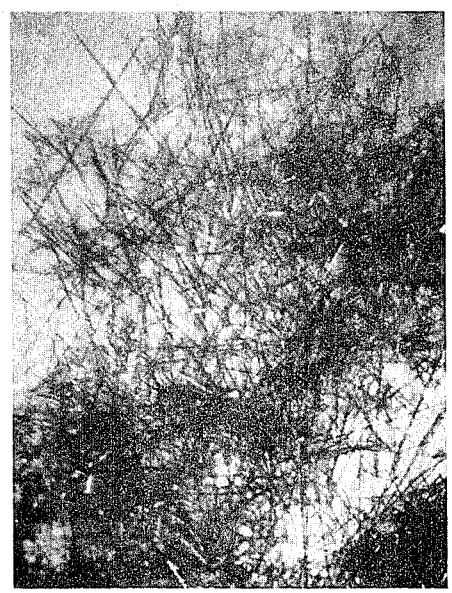

A 10 mm square, 0.2 mm thick sheet of 99.9% purity metallic molybdenum weighing 0.2 g was placed on an alumina substrate and heated at 850° C. for an hour in the air. There was obtained about 0.3 g of molybdenum oxide whiskers. No unoxidized metallic molybdenum was found. FIG. 2 is a microphotograph of 15 magnifications of those whiskers. They were in the form of filaments or rods having a diameter not exceeding 40 microns and a length not exceeding 4 mm.

EXAMPLE 7

A 10 mm square, 0.2 mm thick sheet of 99.9% purity metallic molybdenum weighing 0.2 g was placed on an alumina substrate and heated at 900° C. for an hour in the air. There was obtained about 0.3 g of molybdenum oxide whiskers.

EXAMPLE 8

A 0.5 mm dia., 95 mm long wire of 99.9% purity metallic molybdenum weighing 0.18 g was placed on an alumina substrate and heated at 850° C. for an hour in the air. There was obtained about 0.27 g of molybdenum oxide whiskers, while no unoxidized metallic molybdenum was found.

EXAMPLE 9

A mass of granules of 99.9% purity metallic molybdenum weighing about 0.02 g per granule, and a total of 0.25 g was placed on an alumina substrate and heated at 850° C. for an hour in the air. There were obtained about 0.37 g of molybdenum oxide whiskers, while no unoxidized metallic molybdenum was found.

EXAMPLE 10

Figure 3:

One gram of molybdenum(VI) dioxyacetylacetonate was placed on an alumina substrate and fired at 700° C. for three hour in the air. There were obtained 300 mg of molybdenum oxide whiskers of which one form is shown in FIG. 3. They were in the form of filaments or rods having a diameter of about 60 microns and a length of about 3 mm, or flakes having a thickness of about 10 microns, a width of about 100 microns and a length of about 5 mm.

EXAMPLE 11

0.5 g of molybdenum(VI) acetylacetonate was placed on an alumina substrate and fired at 750° C. for two hours in the air. There were obtained molybdenum oxide whiskers having various forms, such as filaments, rods and flakes.

EXAMPLE 12

0.5 g of molybdenum(VI) 8-hydroxyquinoline was placed on an alumina substrate and fired at 800° C. for an hour in the air. There were obtained molybdenum oxide whiskers having various forms, such as filments, rods and flakes.

EXAMPLE 13

0.5 g of molybdenum(VI) diethyldithiocarbamate was placed on an alumina substrate and fired at 850° C. for an hour in the air. There were obtained molybdenum oxide whiskers having various forms, such as filaments, rods and flakes.

All of the whiskers obtained in Examples 1 to 13 were ascertained by X-ray diffraction as whiskers of molybdenum oxide.

EXAMPLE 14

Figure 4:
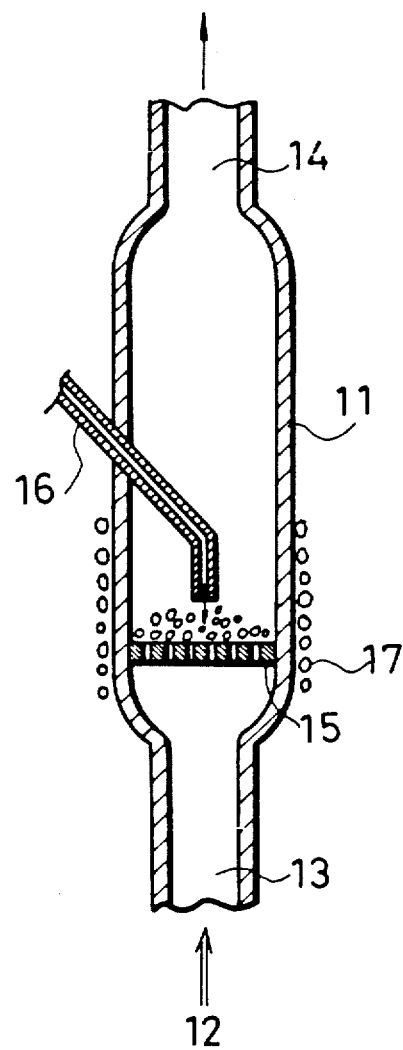
FIG. 4 is a longitudinal sectional view showing by way of example an apparatus which can be used for carrying out the method of this invention on an industrial basis.

An apparatus for producing molybdenum oxide whiskers was constructed, as shown in FIG. 4. It comprises a quartz tube 11 having an inlet 13 for an oxygen-containing gas 12 at one end and an outlet 14 therefor at the other end. The interior of the tube 11 defines a passage for the gas 12. A porous plate 15 of a heat resistant material, such as alumina, is disposed in the tube 11. A tube 16 for supplying metallic molybdenum extends into the tube 11 and has an open end located above the porous plate 15. An annular heater 17 surrounds the tube 11 and the porous plate 15 disposed therein.

Metallic molybdenum in the form of granule, powder, sheet, wire, or the like is supplied onto the porous plate 15 through the tube 16. The oxygen-containing gas 12, which is preheated to a temperature of at least about 80° C., is blown into the tube 11 through the inlet 13, and caused to flow therethrough and leave it through the outlet 14. The gas 12 is preheated to prevent the internal temperature of the tube 11 from dropping and raise the efficiency with which the metallic molybdenum is oxidized, though it is possible to employ the gas 12 at ambient temperature. The heater 17 is turned on to heat the porous plate 15 and its vicinity to a temperature of at least 800° C. The metallic molybdenum is gradually oxidized by the gas 12 to form sublimed or vaporized molybdenum oxide. The molybdenum oxide is carried upward by the gas 12 and leaves the tube 11 through the outlet 14, while forming whiskers. The whiskers leaving the tube 11 are separated from the gas 12 by an appropriate device. The flow rate of the gas 12 should not be too high, but should be controlled to suit the speed at which whiskers are formed. The results of experiments show that a preferred flow rate of the gas 12 is approximately from 0.1 to 10 liters per minute.

What is claimed is:

1. A method of producing whiskers of molybdenum oxide $MoO_3$ comprising:

firing metallic molybdenum in an open-ended vessel at a temperature of at least 400° C. in a flow of gas through the vessel containing oxygen;

recovering the resulting whiskers of molybdenum oxide from the gas exiting the end of the vessel;

heating molybdenum oxide remaining in the vessel to a temperature of 950° C. to 1100° C. in a hydrogen atmosphere to reduce it into metallic molybdenum; and reusing the metallic molybdenum obtained by said reduction as a starting material.

2. A method as set forth in claim 1, wherein said temperature is at least 800° C.

3. A method as set forth in claim 1, wherein said metallic molybdenum to be fired is in the form selected from sheet, wire, rod, granule and powder.

* * * * *

UNITED STATES PATENT AND TRADEMARK OFFICE
CERTIFICATE OF CORRECTION

PATENT NO. : 4,690,813

DATED : September 1, 1987

INVENTOR(S) : Yoshimi Kamijyo

It is certified that error appears in the above-identified patent and that said Letters Patent is hereby corrected as shown below:

On the title page, "3 Drawing Figures" should be --4 Drawing Figures--.

The sheet of drawing, consisting of Fig. 4, should be added as shown on the attached sheet.

Signed and Sealed this

Eleventh Day of June, 1991

Attest:

HARRY F. MANBECK, JR.

Attesting Officer

Commissioner of Patents and Trademarks